US011965465B2

(12) United States Patent
Quesada et al.

(10) Patent No.: US 11,965,465 B2
(45) Date of Patent: Apr. 23, 2024

(54) ACOUSTIC PANEL WITH MULTIPLE LAYER CORRUGATED CORE

(71) Applicant: Rohr, Inc., Chula Vista, CA (US)

(72) Inventors: Marc W. Quesada, Yucaipa, CA (US); Jose S. Alonso-Miralles, Chula Vista, CA (US); Kathryn Mireles, San Diego, CA (US); Michael Scamardo, Rancho Cucamonga, CA (US); Richard S. Alloway, San Diego, CA (US); Luby Weaver, Redlands, CA (US); Yves Klett, Gerlingen (DE)

(73) Assignee: Rohr, Inc., Chula Vista, CA (US)

( * ) Notice: Subject to any disclaimer, the term of this patent is extended or adjusted under 35 U.S.C. 154(b) by 120 days.

(21) Appl. No.: 17/130,447

(22) Filed: Dec. 22, 2020

(65) Prior Publication Data

US 2022/0195932 A1    Jun. 23, 2022

(51) Int. Cl.
| F02C 7/24 | (2006.01) |
| B32B 3/26 | (2006.01) |
| B32B 3/28 | (2006.01) |
| B32B 3/30 | (2006.01) |

(52) U.S. Cl.
CPC ............... *F02C 7/24* (2013.01); *B32B 3/266* (2013.01); *B32B 3/28* (2013.01); *B32B 3/30* (2013.01); *B32B 2250/03* (2013.01); *B32B 2307/10* (2013.01); *B32B 2605/18* (2013.01); *F05D 2220/323* (2013.01); *F05D 2250/191* (2013.01); *F05D 2260/96* (2013.01)

(58) Field of Classification Search
CPC ... F02C 7/24; B32B 3/266; B32B 3/28; B32B 3/30; B32B 2250/03; B32B 2307/10; B32B 2605/18; F05D 2220/323; F05D 2250/191; F05D 2260/96; Y10T 428/24149; Y10T 428/24273; Y10T 428/24628; Y10T 428/24479; Y10T 428/24496; Y10T 428/2457; Y10T 428/24661; Y10T 428/24669; Y10T 428/24711; Y10T 428/24802; Y10T 428/24826
USPC ....... 428/116, 131, 156, 158, 174, 178, 179, 428/184, 195.1, 198
See application file for complete search history.

(56) References Cited

U.S. PATENT DOCUMENTS

| 4,886,696 A | 12/1989 | Bainbridge |
| 5,785,919 A | 7/1998 | Wilson |
| 6,274,216 B1 | 8/2001 | Gonidec |
| 6,536,556 B2 | 3/2003 | Porte |

(Continued)

FOREIGN PATENT DOCUMENTS

| CN | 104175616 B | 6/2016 |
| CN | 104723616 B | 7/2016 |

(Continued)

OTHER PUBLICATIONS

EP search report for EP21216442.0 dated May 13, 2022.

*Primary Examiner* — Megha M Gaitonde
(74) *Attorney, Agent, or Firm* — Getz Balich LLC

(57) ABSTRACT

An acoustic panel is provided that includes a perforated first skin, a second skin and a core. The core is between and connected to the perforated first skin and the second skin. The core includes a plurality of chambers, a first corrugated structure and a second corrugated structure. The chambers includes a first chamber. The first chamber extends from the perforated first skin, through the first corrugated structure and the second corrugated structure, to the second skin.

19 Claims, 12 Drawing Sheets

(56) References Cited

U.S. PATENT DOCUMENTS

| | | |
|---|---|---|
| 7,051,489 B1 | 5/2006 | Swiszcz |
| 8,302,733 B2 | 11/2012 | Peiffer |
| 8,727,072 B2 | 5/2014 | Ayle |
| 8,955,643 B2 | 2/2015 | Liu |
| 9,403,338 B2 | 8/2016 | Tuczek |
| 9,469,985 B1 | 10/2016 | Ichihashi |
| 9,592,918 B2 | 3/2017 | Yu |
| 9,708,930 B2 | 7/2017 | Koroly |
| 9,732,677 B1 | 8/2017 | Chien |
| 9,764,818 B2 | 9/2017 | Nampy |
| 10,332,501 B2 | 6/2019 | Lin |
| 2007/0034447 A1 | 2/2007 | Proscia |
| 2008/0020176 A1 | 1/2008 | Ayle |
| 2008/0020188 A1 | 1/2008 | Gale |
| 2014/0349082 A1 | 11/2014 | Tien |
| 2015/0367953 A1 | 12/2015 | Yu |
| 2017/0028667 A1 | 2/2017 | Fach |
| 2017/0182723 A1 | 6/2017 | Calisch |
| 2017/0225764 A1 | 8/2017 | Nampy |
| 2017/0301334 A1 | 10/2017 | Nampy |
| 2018/0142621 A1 | 5/2018 | Biset |
| 2018/0142622 A1 | 5/2018 | Biset |
| 2019/0270504 A1 | 9/2019 | Cedar |
| 2020/0003230 A1 | 1/2020 | Alonso-Miralles |
| 2020/0063691 A1 | 2/2020 | Kruckenberg |
| 2020/0309028 A1 | 10/2020 | Murugappan |

FOREIGN PATENT DOCUMENTS

| | | |
|---|---|---|
| EP | 1690997 B1 | 1/2008 |
| EP | 2844463 B1 | 12/2017 |
| GB | 2550926 B | 7/2018 |
| JP | 5151535 | 2/2013 |
| WO | 2014200499 A1 | 12/2014 |

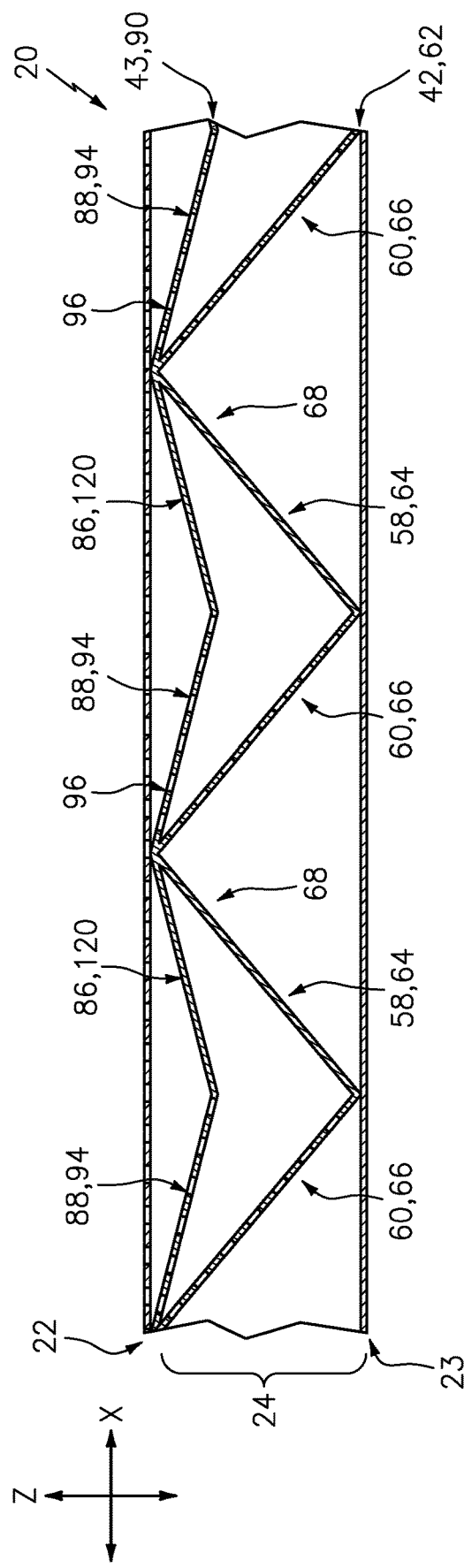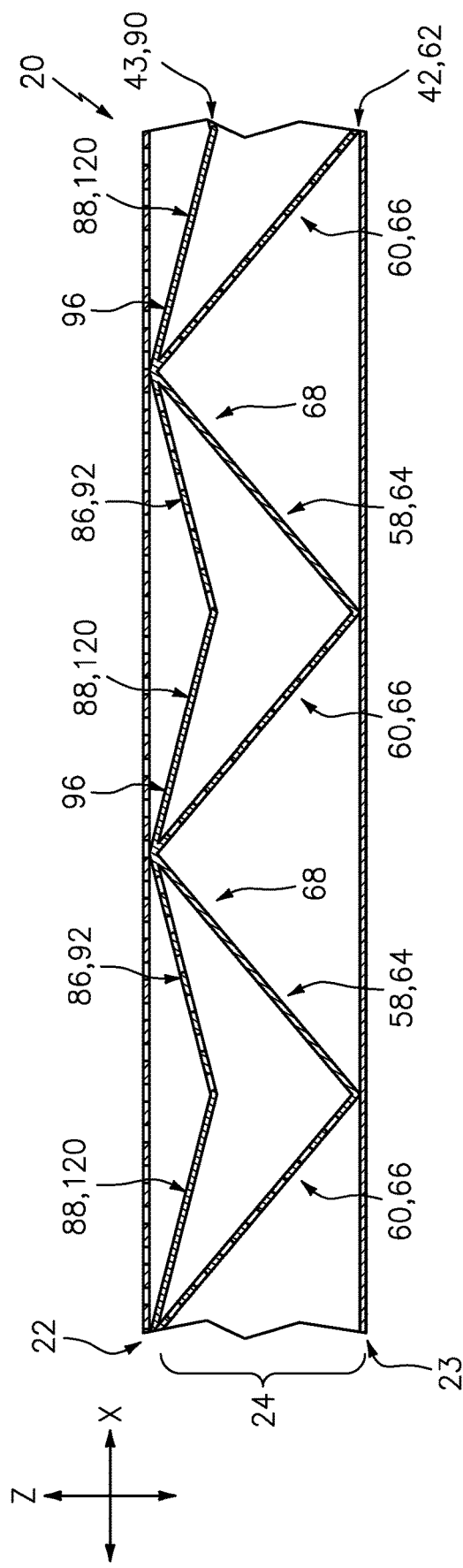

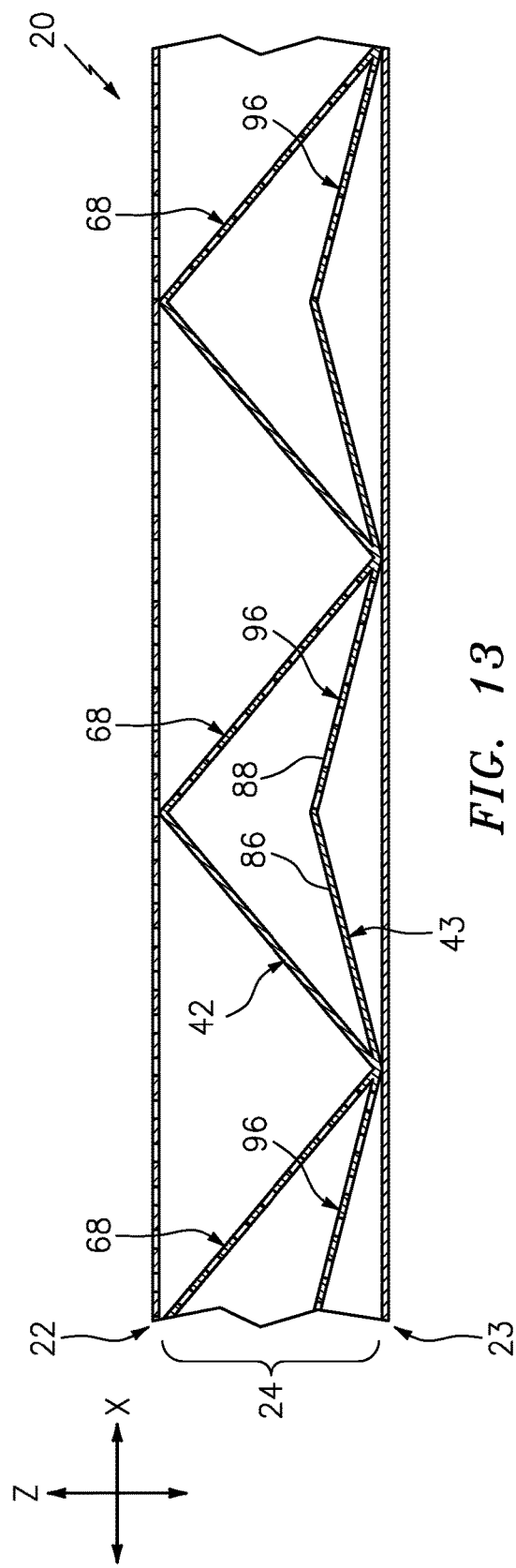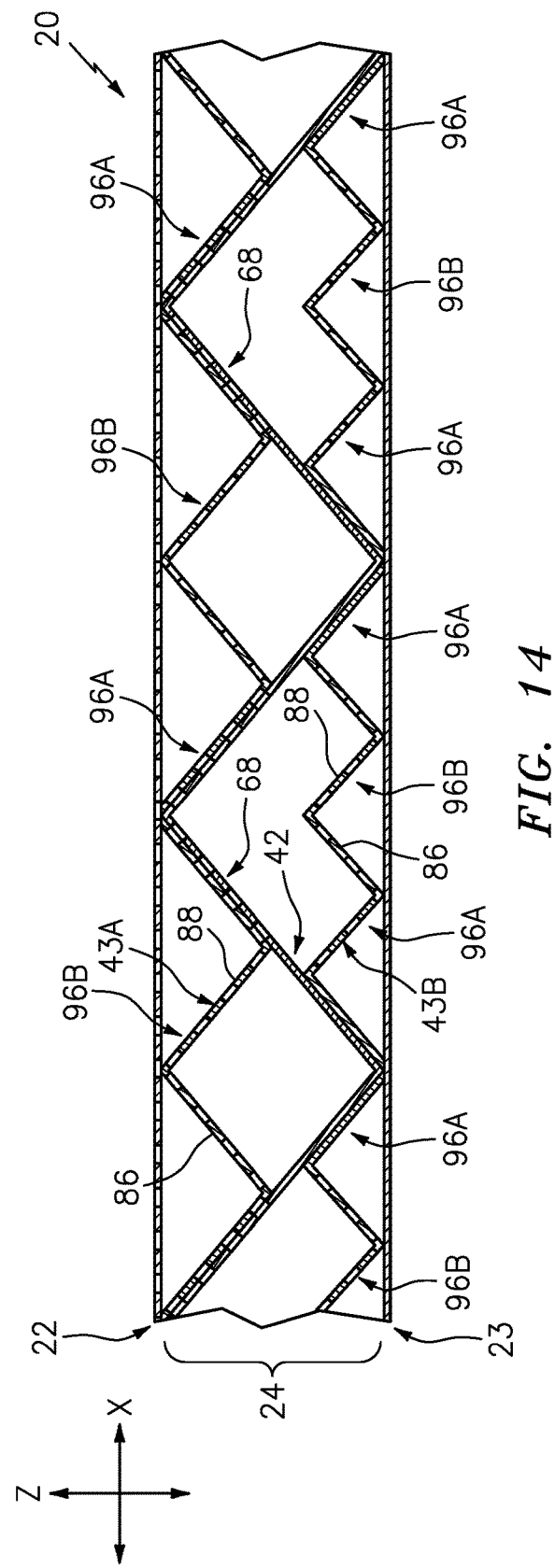

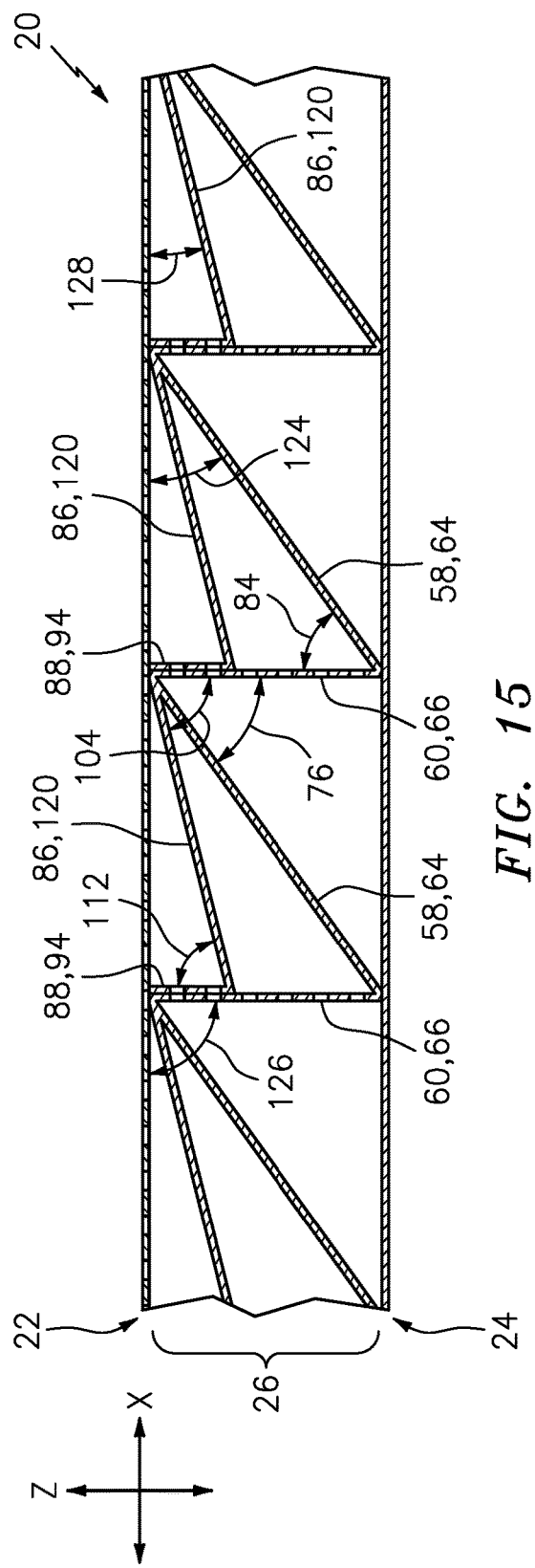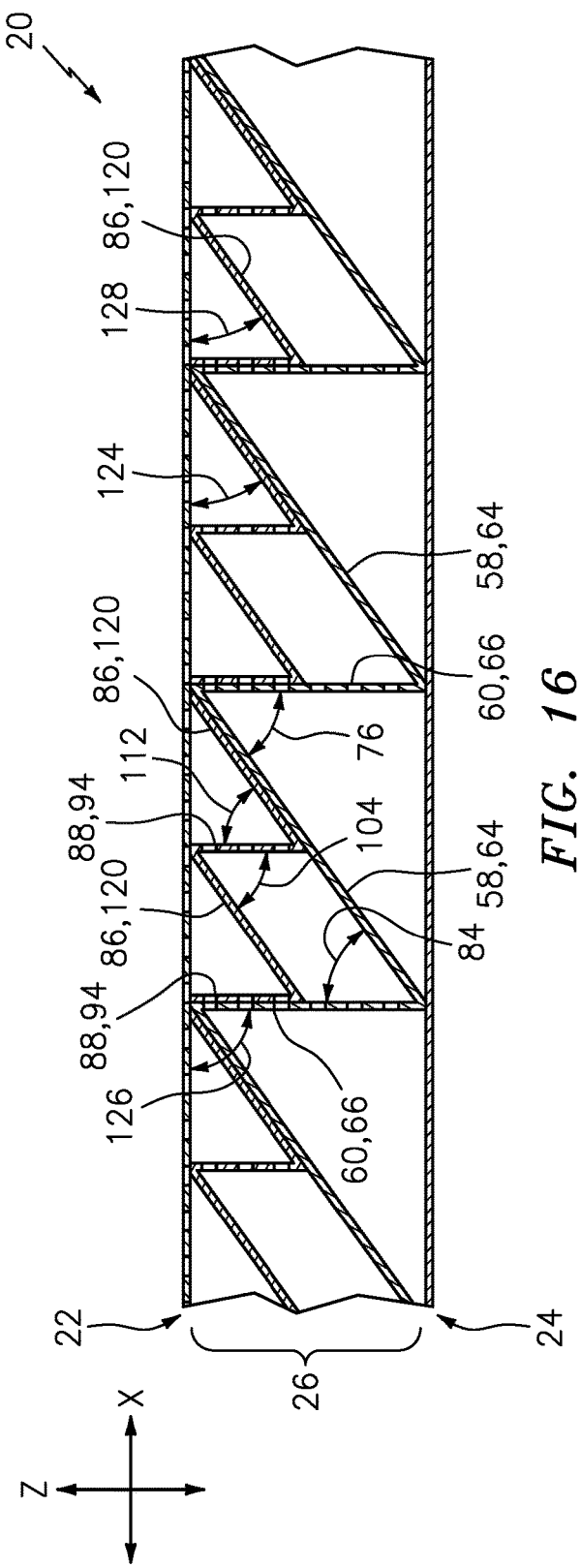

ACOUSTIC PANEL WITH MULTIPLE LAYER CORRUGATED CORE

BACKGROUND

1. Technical Field

This disclosure relates generally to acoustic panels such as, but not limited to, an acoustic panel for attenuating sound generated by an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers to attenuate higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints for those engines, however, typically limit or prohibit increasing the thickness of an acoustic panel to tune its resonating chambers for such relatively low frequency noise. Furthermore, including septums within the resonating chambers to provide the acoustic panel with multiple degrees of freedom can be complex and cost prohibitive. There is a need in the art therefore for a multi-degree of freedom (MDOF) acoustic panel operable to attenuate relatively low frequency noise, as well as other select noise frequencies, while utilizing the same or less space than previous acoustic panels. There is a further need to provide a multi-degree of freedom (MDOF) acoustic panel configuration capable of reducing panel assembly time, complexity and cost.

SUMMARY OF THE DISCLOSURE

According to an aspect of the present disclosure, an acoustic panel is provided that includes a perforated first skin, a second skin and a core. The core is between and connected to the perforated first skin and the second skin. The core includes a plurality of chambers, a first corrugated structure and a second corrugated structure. The chambers includes a first chamber. The first chamber extends from the perforated first skin, through the first corrugated structure and the second corrugated structure, to the second skin.

According to another aspect of the present disclosure, another acoustic panel is provided that includes a perforated first skin, a second skin and a cellular core. The cellular core is vertically between and connected to the perforated first skin and the second skin. The cellular core includes a first corrugated ribbon, a second corrugated ribbon, a first sidewall and a second sidewall. The first corrugated ribbon extends laterally between and is connected to the first sidewall and the second sidewall. The first corrugated ribbon includes a plurality of first corrugations arranged in a first longitudinal array. The second corrugated ribbon extends laterally between and is connected to the first sidewall and the second sidewall. The second corrugated ribbon includes a plurality of second corrugations arranged in a second longitudinal array that longitudinally overlaps the first corrugated ribbon.

According to still another aspect of the present disclosure, another acoustic panel is provided that includes a perforated first skin, a second skin and a cellular core. The cellular core is vertically between and connected to the perforated first skin and the second skin. The cellular core includes a first corrugated structure and a second corrugated structure vertically between the first corrugated structure and the second skin. The first corrugated structure includes a first structure first panel and a first structure second panel connected to the first structure first panel at a first peak. The first structure first panel is angularly offset from the first structure second panel by a first angle. The second corrugated structure includes a second structure first panel and a second structure second panel connected to the second structure first panel at a second peak. The second structure first panel is angularly offset from the second structure second panel by a second angle that is different than the first angle.

The cellular core may include a resonance chamber vertically between the perforated first skin and the second skin. The resonance chamber may include a first cavity, a second cavity and a third cavity. The first corrugated structure may be vertically between and may partially form the first cavity and the second cavity. The second corrugated structure may be vertically between and may partially form the second cavity and the third cavity.

The cellular core may be configured with a resonance chamber. The resonance chamber may include a first cavity, a second cavity and a third cavity. The first corrugated ribbon may be vertically between and may partially form the first cavity and the second cavity. The second corrugated ribbon may be vertically between and may partially form the second cavity and the third cavity.

The first corrugated structure may include a first corrugation with a first peak. The second corrugated structure may include a second corrugation with a second peak that is aligned with the first peak.

The first corrugated structure may include a pair of first corrugations. The second corrugated structure may include a second corrugation with a peak. The peak may be aligned with a valley formed by and between the pair of first corrugations.

The first corrugated structure may include a first corrugation with a first peak. The second corrugated structure may include a second corrugation with a second peak. The second peak may be connected to the first peak.

The first corrugated structure may include a first corrugation. The second corrugated structure may include a second corrugation that is nested with the first corrugation.

The first corrugated structure may include a first corrugation with one or more first perforations. The second corrugated structure may include a second corrugation with one or more second perforations. The first chamber may extend from the perforated first skin, through the one or more first perforations and the one or more second perforations, to the second skin.

The first corrugated structure may include a first structure first panel and a first structure second panel that is connected to the first structure first panel at a first peak. The first structure first panel may be angularly offset from the first structure second panel by a first angle. The second corrugated structure may include a second structure first panel and a second structure second panel that is connected to the second structure first panel at a second peak. The second structure first panel may be angularly offset from the second structure second panel by a second angle. The second angle may be different than the first angle.

The first structure first panel may be configured as a baffle. The first structure second panel and the second structure second panel may each be configured as a septum.

The second structure first panel may be configured as a septum.

The second structure first panel may be configured as a baffle.

The second structure first panel may overlap the first structure first panel.

The second structure first panel may overlap the first structure second panel.

The first corrugated structure may include a first corrugation. The second corrugated structure may include a plurality of second corrugations. The first corrugation may overlap the second corrugations.

The core may also include a third corrugated structure. The first chamber may extend from the perforated first skin, through the first corrugated structure, the second corrugated structure and the third corrugated structure, to the second skin.

The core may also include a first sidewall and a second sidewall. The first chamber may extend laterally between the first sidewall and the second sidewall. The first corrugated structure and the second corrugated structure may each be connected to and may extend laterally between the first sidewall and the second sidewall.

At least the perforated first skin, the second skin and the core may form a component of an aircraft propulsion system.

The first corrugated structure may be configured as or otherwise include a primary corrugated structure. In addition or alternatively, the second corrugated structure may be configured as or otherwise include a secondary corrugated structure.

The first corrugated structure may be configured as or otherwise include a secondary corrugated structure. In addition or alternatively, the second corrugated structure may be configured as or otherwise include a primary corrugated structure.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 9-14 are partial sectional illustrations of the acoustic panel with various alternative cellular core configurations.

FIGS. 15 and 16 are partial sectional illustrations of the acoustic panel with various asymmetric corrugation configurations.

DETAILED DESCRIPTION

Figure 1:
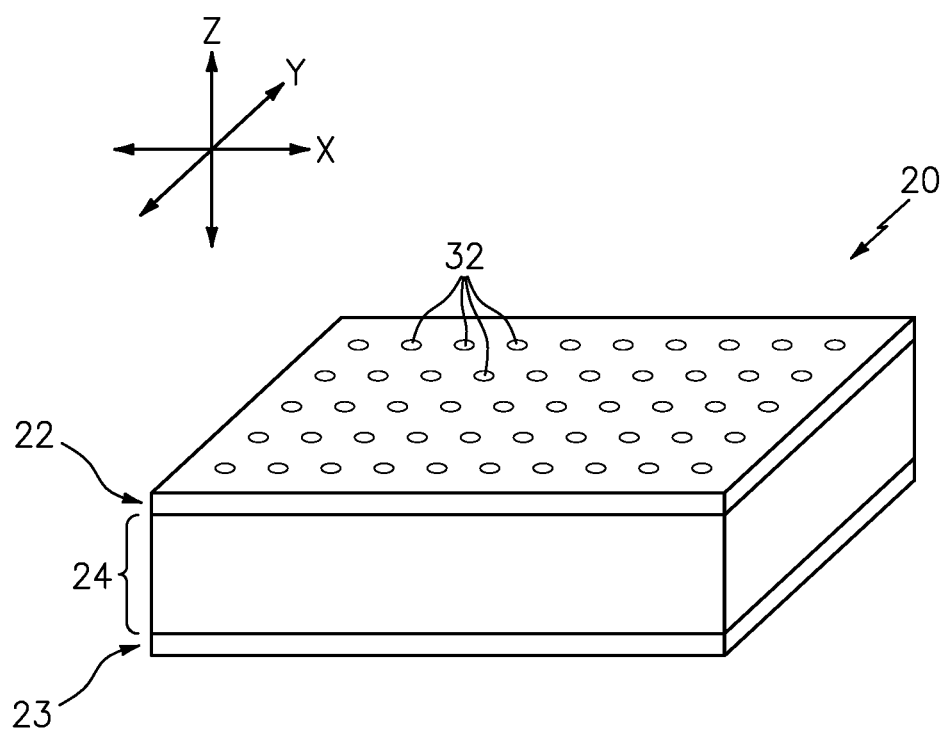
FIG. 1 is a partial perspective schematic illustration of a structural, acoustic panel for attenuating sound.

FIG. 1 is a partial perspective schematic illustration of a structural, acoustic panel 20 for attenuating sound; e.g., noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or otherwise included as part of an inner or outer barrel, a translating sleeve, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than noise generated by the propulsion system. The acoustic panel 20 of the present disclosure, of course, may alternatively be configured for non-aircraft applications.

The acoustic panel 20 extends longitudinally along an x-axis. The acoustic panel 20 extends laterally along a y-axis. The acoustic panel 20 extends vertically along a z-axis. Note, the term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 20 includes a perforated first skin 22 (e.g., a face, front and/or exterior skin with one or more through-holes), a solid, non-perforated second skin 23 (e.g., a back and/or interior skin without any through-holes) and a structural cellular core 24 (e.g., a multi-layer corrugated core). Briefly, the cellular core 24 is arranged and extends vertically between the first skin 22 and the second skin 23. The cellular core 24 is also connected to the first skin 22 and/or the second skin 23. The cellular core 24, for example, may be welded, brazed, fused, adhered or otherwise bonded to the first skin 22 and/or the second skin 23. The cellular core 24 may also or alternatively be mechanically fastened to the first skin 22 and/or the second skin 23. Alternatively, the cellular core 24 may be formed integral with the first skin 22 and/or the second skin 23 as a monolithic body using, for example, a molding process or an additive manufacturing process. The present disclosure, of course, is not limited to any particular manufacturing methods.

Figure 2:
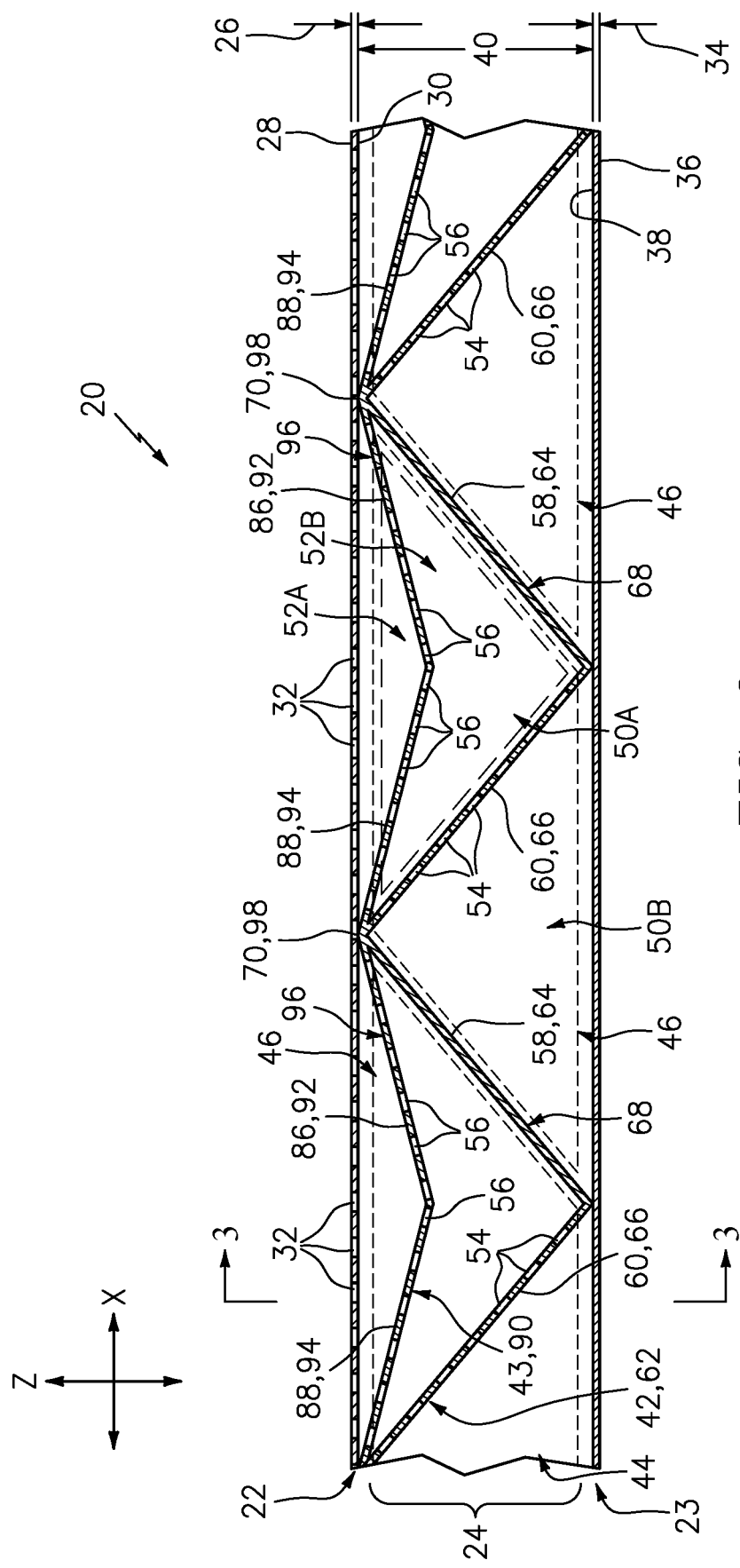
FIG. 2 is a partial sectional illustration of the acoustic panel.

The first skin 22 may be configured as a relatively thin sheet or layer of material that extends laterally and longitudinally along the x-y plane. This first skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. Referring now to FIG. 2, the first skin 22 has a vertical thickness 26. This first skin vertical thickness 26 extends vertically between opposing side surfaces 28 and 30 of the first skin 22. The first skin 22 includes a plurality of perforations 32; e.g., apertures such as through-holes. Each of these perforations 32 extends generally vertically through the first skin 22 between the first skin side surfaces 28 and 30.

The second skin 23 may be configured as a relatively thin sheet or layer of (e.g., continuous and uninterrupted) material that extends laterally and longitudinally along the x-y plane (see FIG. 1). This second skin material may include, but is not limited to, metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. The second skin material may be the same as or different than the first skin material. The second skin 23 has a vertical thickness 34. This second skin vertical thickness 34 extends vertically between opposing side surfaces 36 and 38 of the second skin 23. The second skin vertical thickness 34 may be substantially equal to or different (e.g., greater or less) than the first skin vertical thickness 26.

The cellular core 24 extends laterally and longitudinally along the x-y plane (see FIG. 1). The cellular core 24 has a vertical thickness 40. This core vertical thickness 40 extends vertically between opposing sides of the cellular core 24, which core sides are respectively abutted against the interior first skin side 30 and the interior second skin side 38. The core vertical thickness 40 may be substantially greater than the first skin vertical thickness 26 and/or the second skin vertical thickness 34. The core vertical thickness 40, for example, may be at least ten to forty times (10-40×), or more, greater than the vertical thickness 26, 34; however, the acoustic panel 20 of the present disclosure is not limited to such an exemplary embodiment.

Figure 3:
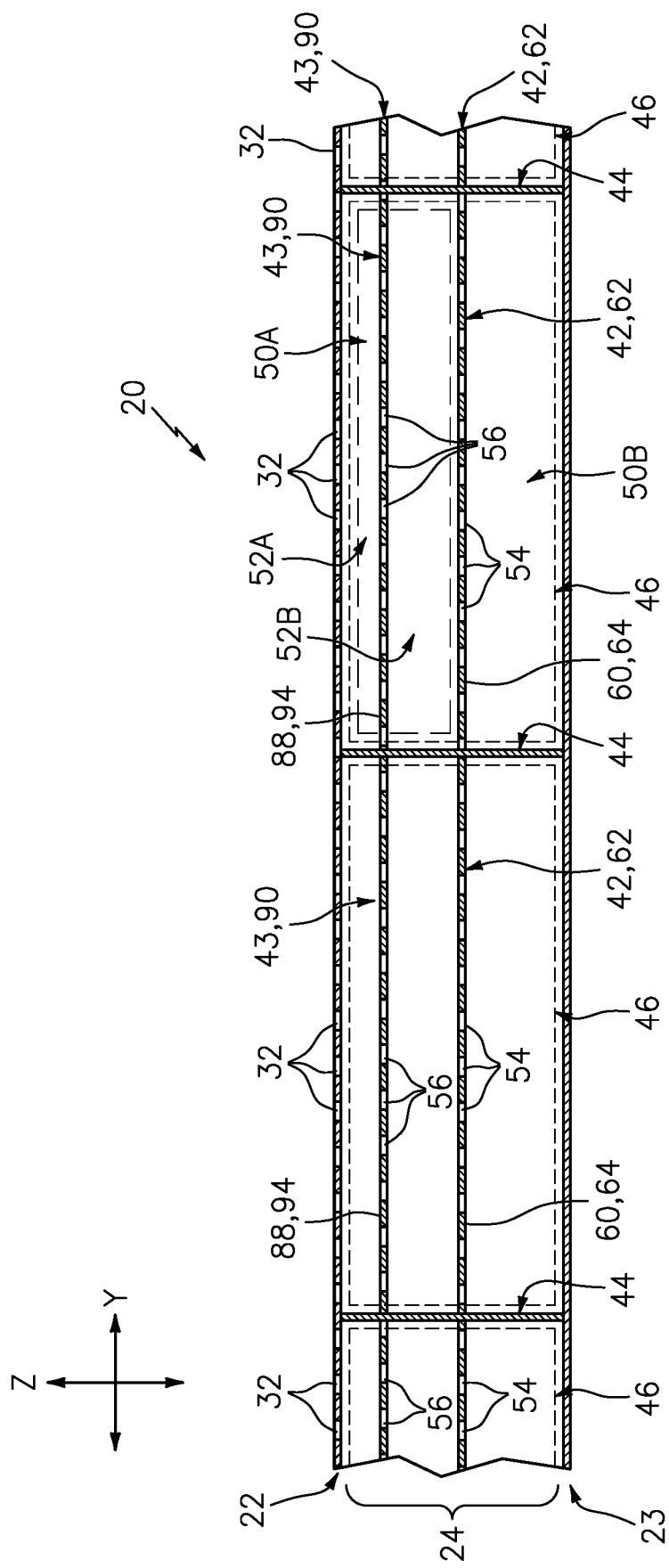
FIG. 3 is a partial sectional illustration of the acoustic panel taken along line 3-3 in FIG. 2.
Figure 4:
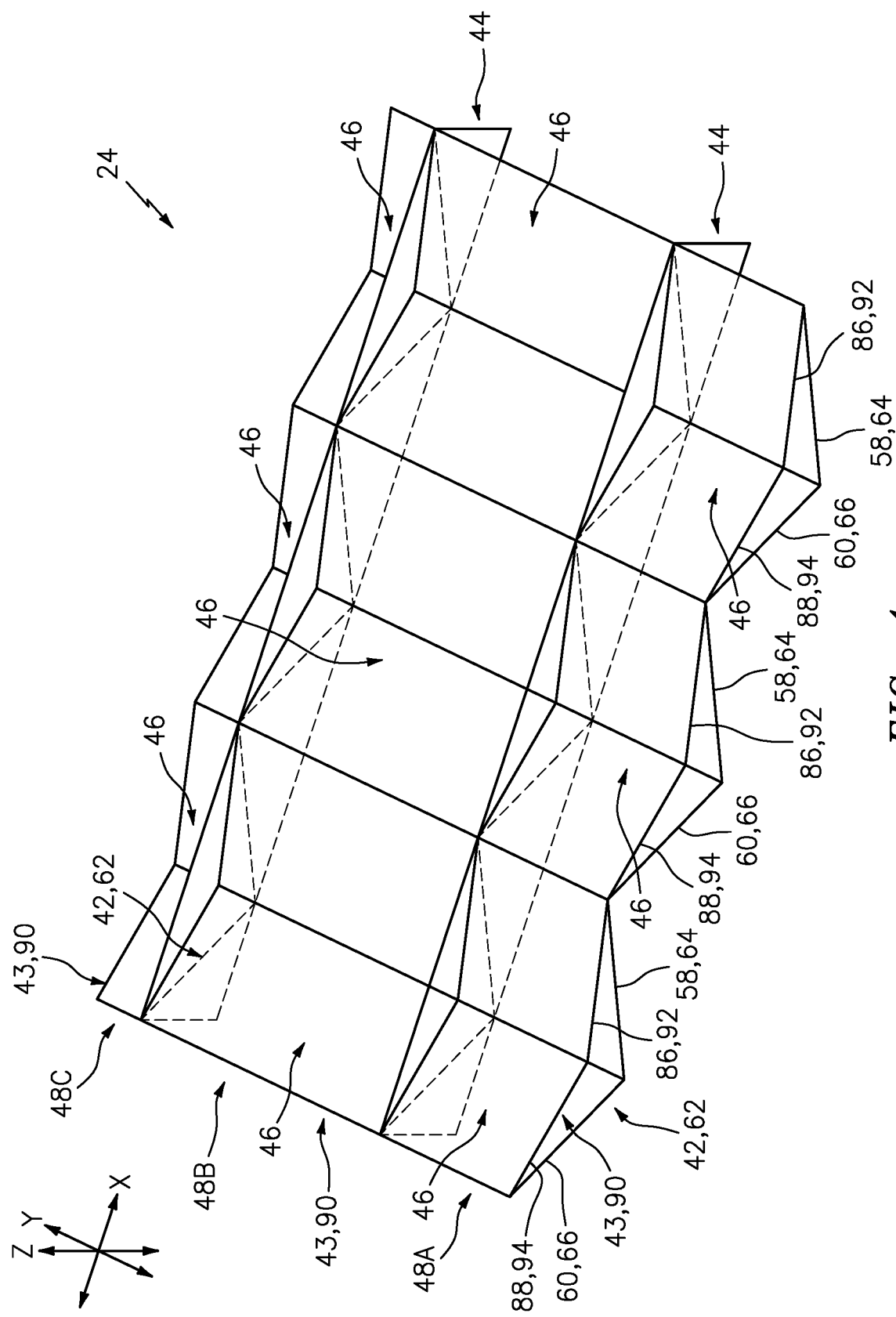
FIG. 4 is a partial perspective illustration of a cellular core for the acoustic panel.

Referring to FIGS. 2, 3 and 4, the cellular core 24 includes a plurality of corrugated structures (e.g., 42 and 43) and a plurality of (e.g., planar) chamber sidewalls 44. These cellular core components (e.g., 42-44) are arranged together to provide the cellular core 24 with a plurality of internal (e.g., resonance) chambers 46 vertically between the first skin 22 and the second skin 23. The internal chambers 46 of FIG. 4 are arranged in one or more linear chamber arrays 48A, 48B, 48C (generally referred to as "48"), where each chamber array 48 extends longitudinally along the x-axis. Each chamber array 48 includes a plurality of the internal chambers 46. Each of the internal chambers 46 of FIGS. 2 and 3 is respectively fluidly coupled with one or more of the perforations 32 in the first skin 22.

Referring to FIGS. 2, 3 and 4, the sidewalls 44 may be arranged generally parallel with one another. The sidewalls 44 are spaced laterally from one another so as to respectively form the internal chambers 46 laterally between the sidewalls 44. Each of the sidewalls 44 thereby respectively forms lateral peripheral sides of the internal chambers 46 in at least one of the chamber arrays 48. Each intermediate sidewall 44 (e.g., a sidewall laterally disposed between two other sidewalls), for example, forms the lateral peripheral sides of the respective internal chambers 46 in a first of the chamber arrays (e.g., 48A) as well as the lateral peripheral sides of the respective internal chambers 46 in a second of the chamber arrays (e.g., 48B) that laterally neighbors (e.g., is immediately adjacent, next to) the first of the chamber arrays (e.g., 48A). Each intermediate sidewall 44 is located laterally between the respective laterally neighboring pair of chamber arrays 48 (e.g., the first and second chamber arrays 48A and 48B). Each intermediate sidewall 44 may therefore fluidly separate the internal chambers 46 in the respective laterally neighboring pair of chamber arrays (e.g., 48A and 48B) from one another.

Referring to FIG. 3, each of the sidewalls 44 extends vertically between the first skin 22 and the second skin 23. Each of the sidewalls 44 may also be connected (e.g., bonded and/or otherwise attached) to the first skin 22 and/or the second skin 23. Each of the sidewalls 44 is orientated substantially perpendicular to the first skin 22 and the second skin 23. However, in other embodiments, one or more of the sidewalls 44 may be angularly offset from the first skin 22 and/or the second skin 23 by a non-ninety degree angle; e.g., an acute included angle.

The corrugated structures of FIGS. 2, 3 and 4 includes one or more primary (e.g., full core, central) corrugated structures 42 and one or more secondary (e.g., partial core, side) corrugated structures 43. Each primary corrugated structure 42 may be (e.g., uniquely) associated with at least one (or only one) of the secondary corrugated structures 43.

Each primary corrugated structure 42 may extend substantially vertically across the cellular core 24 between the first and the second skins 22 and 23. Each primary corrugated structure 42, for example, may extend vertically between the first and the second skins 22 and 23 at least eighty or ninety or ninety-five percent (80, 90 or 95%) of the core vertical thickness 40 (see FIG. 2). The present disclosure, however, is not limited to such an exemplary primary corrugated structure vertical thickness. Each primary corrugated structure 42 is configured to form one or more primary cavities 50A and 50B (generally referred to as "50") within the cellular core 24; see FIGS. 2 and 3.

Each secondary corrugated structure 43 extends partially across the cellular core 24 between the first and the second skins 22 and 23. Each secondary corrugated structure 43, for example, may extend between ten or twenty percent (10 or 20%) and forty or fifty percent (40 or 50%) of the core vertical thickness 40 (see FIG. 2). Each secondary corrugated structure 43 is disposed to a side of a respective one of the primary corrugated structures 42; e.g., vertically between the primary corrugated structure 42 and the first skin 22. The present disclosure, however, is not limited to such an exemplary secondary corrugated structure vertical thickness. Each secondary corrugated structure 43 may divide one or more of the primary cavities 50 (e.g., 50A) into a plurality of secondary cavities (sub-cavities) 52A and 52B (generally referred to as "52") within the cellular core 24.

Each primary cavity 50B of FIGS. 2 and 3 is fluidly coupled with a respective one of the secondary cavities 52B through one or more perforations 54 in the primary corrugated structure 42; note, the perforations 54 are not shown in FIG. 4 for ease of illustration. Each secondary cavity 52B of FIGS. 2 and 3 is fluidly coupled with a respective one of the secondary cavities 52A through one or more perforations 56 in the secondary corrugated structure 43; note, the perforations 56 are not shown in FIG. 4 for ease of illustration. Each fluidly coupled set of primary and secondary cavities 50 and 52 collectively form a respective one of the internal chambers 46 within the cellular core 24. Thus, the internal chambers 46 in each chamber array 48 may be (e.g., uniquely) associated with a respective one of the primary corrugated structures 42 and a respective one of the secondary corrugated structures 43.

Each primary corrugated structure 42 of FIGS. 2 and 3 includes one or more primary structure first panels 58 (e.g., members, segments, etc.) and one or more primary structure second panels 60 (e.g., members, segments, etc.). These primary structure panels 58 and 60 are arranged together and are interconnected to provide a primary structure corrugated ribbon 62; e.g., a longitudinally elongated panel, layer, etc. The primary structure first panels 58 of FIGS. 2 and 3 are configured as primary structure baffles 64; e.g., solid, non-perforated segments of the primary structure corrugated ribbon 62. The primary structure second panels 60 of FIGS. 2 and 3 are configured as primary structure septums 66; e.g., perforated segments of the primary structure corrugated ribbon 62. Each of these primary structure septums 66 includes one or more of the perforations 54; e.g., through-holes.

Figure 5:
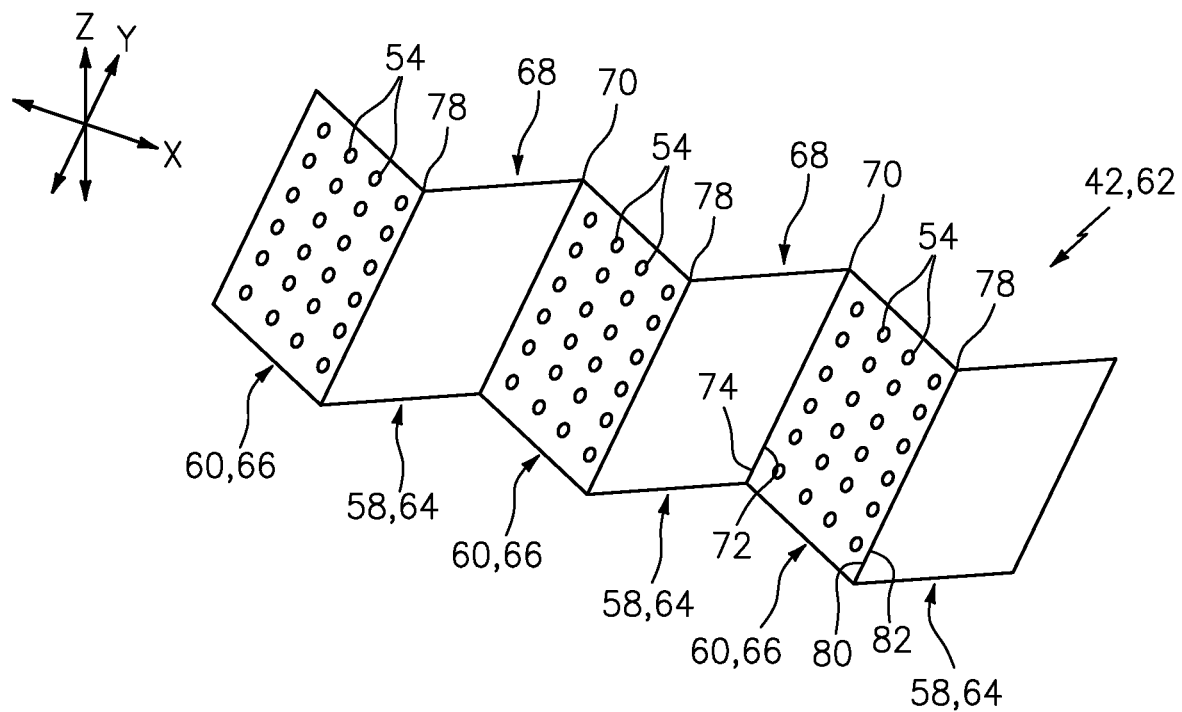
FIG. 5 is a partial perspective illustration of a primary corrugated structure included in the cellular core.

Referring to FIG. 5, the primary structure baffles 64 and the primary structure septums 66 are arranged together into a longitudinally extending linear array to provide a respective primary corrugated ribbon 62. The primary structure baffles 64 are interspersed with the primary structure septums 66. Each primary structure baffle 64 (unless configured at a longitudinal end of the sidewall 44), for example, is disposed and may extend longitudinally between and to a respective longitudinally neighboring pair of the primary structure septums 66. Similarly, each primary structure septum 66 (unless configured at a longitudinal end of the sidewall 44) is disposed and may extend longitudinally between and to a respective longitudinally neighboring pair of the primary structure baffles 64.

The primary corrugated structure 42 includes one or more primary structure corrugations 68. Each of these primary structure corrugations 68 includes a longitudinally neighboring pair of the primary structure elements 58 and 60, 64 and 66.

Figure 6:
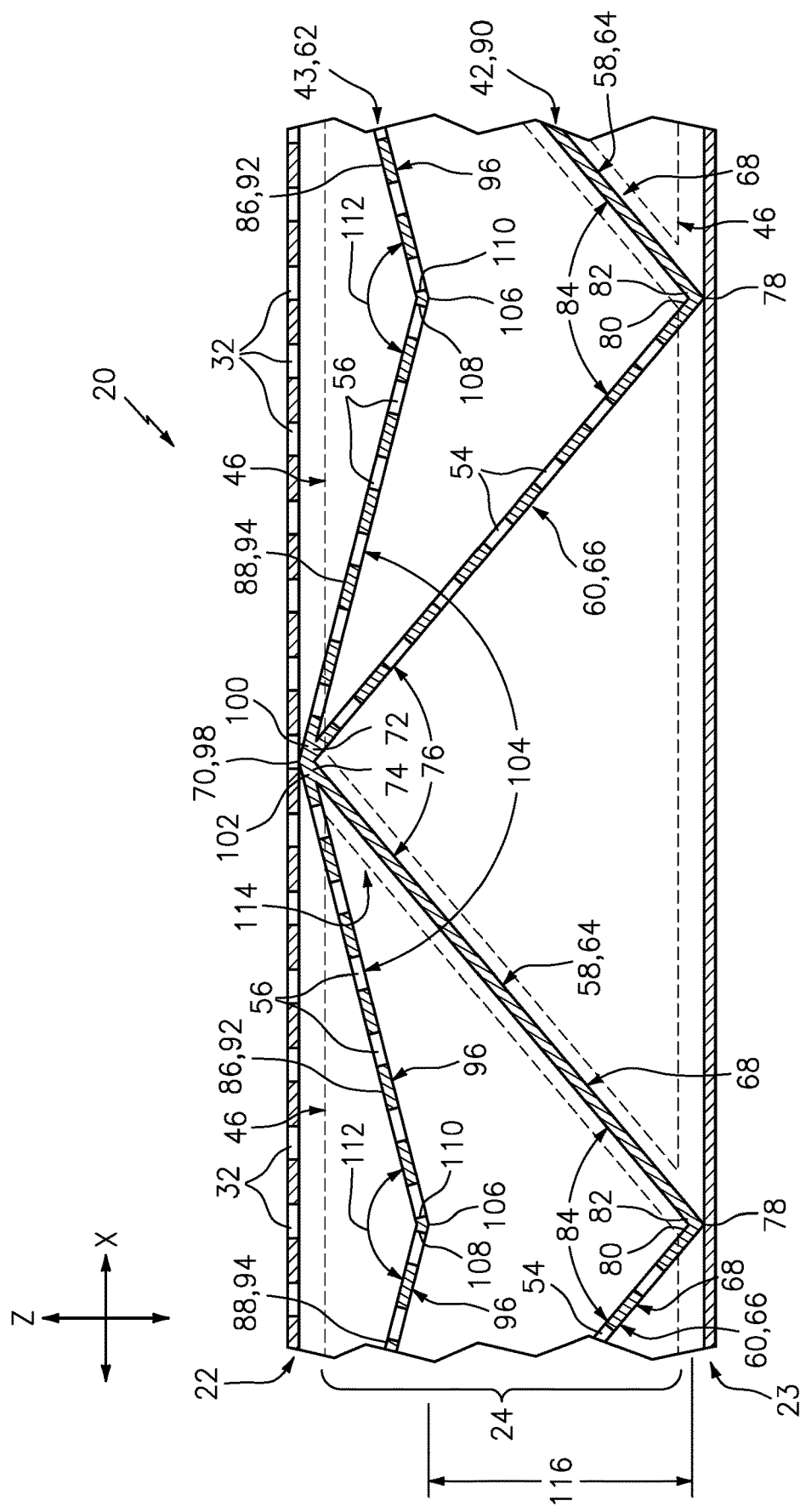
FIG. 6 is an enlarged illustration of a portion of the acoustic panel in FIG. 2.

Referring to FIG. 6, within the same primary structure corrugation 68, each primary structure baffle 64 is connected to and may meet a respective primary structure septum 66 at a peak 70 proximate the first skin 22. Each primary structure baffle 64, for example, extends to a first end 72 thereof. Each primary structure septum 66 extends to a first end 74 thereof. Each baffle first end 72 is (e.g., directly) connected to the first end 74 of the primary structure septum 66 in the same primary structure corrugation 68 at the first skin peak 70. The primary structure baffle 64 is angularly offset from the respective primary structure septum 66 by an included angle 76; e.g., an acute angle, a right angle or an obtuse angle. This first skin peak angle 76 of FIG. 6, for example, may be between sixty degrees(60°) and one-hundred and twenty degrees (120°). The present disclosure, however, is not limited to such an exemplary first skin peak angle.

Each primary structure baffle 64 is connected to and may meet the primary structure septum 66 in a longitudinally neighboring primary structure corrugation 68 at a peak 78 proximate the second skin 23. Each primary structure baffle 64, for example, extends to a second end 80 thereof. Each primary structure septum 66 extends to a second end 82 thereof. Each baffle second end 80 is (e.g., directly) connected to the second end 82 of the primary structure septum 66 in the longitudinally neighboring primary structure corrugation 68 at the second skin peak 78. The primary structure baffle 64 is angularly offset from the respective primary structure septum 66 by an included angle 84; e.g., an acute angle, a right angle or an obtuse angle. This second skin peak angle 84 may be equal to the first skin peak angle 76. The second skin peak angle 84 of FIG. 6, for example, may be between sixty degrees(60°) and one-hundred and twenty degrees (120°). The present disclosure, however, is not limited to such an exemplary second skin peak angle.

Each secondary corrugated structure 43 of FIGS. 2 and 3 includes one or more secondary structure first panels 86 (e.g., members, segments, etc.) and one or more secondary structure second panels 88 (e.g., members, segments, etc.). These secondary structure panels 86 and 88 are arranged together and are interconnected to provide a secondary structure corrugated ribbon 90; e.g., a longitudinally elongated panel, layer, etc. The secondary structure first panels 86 of FIGS. 2 and 3 are configured as secondary structure septums 92; e.g., perforated segments of the secondary structure corrugated ribbon 90. Each of these secondary structure septums 92 includes one or more of the perforations 56; e.g., through-holes. The secondary structure second panels 88 of FIGS. 2 and 3 are also configured as secondary structure septums 94; e.g., perforated segments of the secondary structure corrugated ribbon 90. Each of these secondary structure septums 94 includes one or more of the perforations 56; e.g., through-holes.

Figure 7:
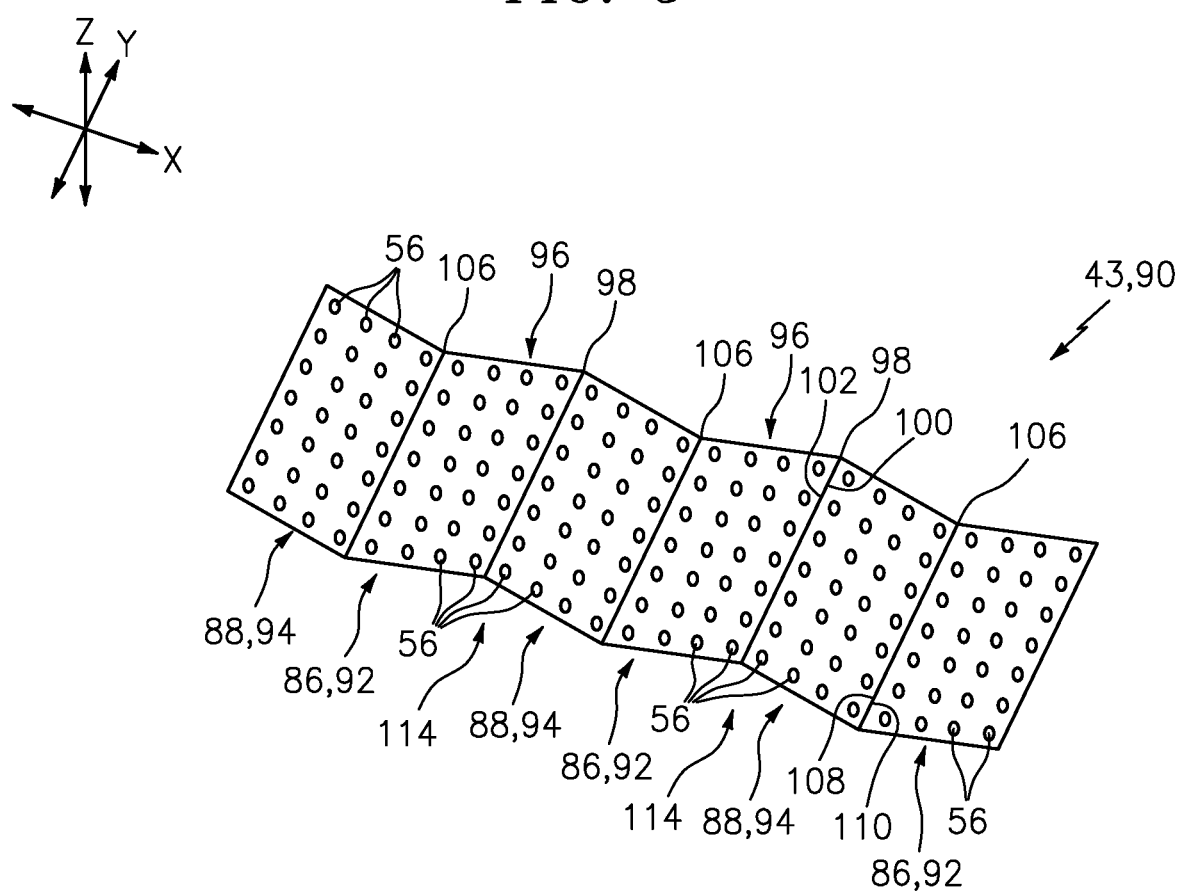
FIG. 7 is a partial perspective illustration of a secondary corrugated structure included in the cellular core.

Referring to FIG. 7, the secondary structure septums 92 and the secondary structure septums 94 are arranged together into a longitudinally extending linear array to provide a respective secondary corrugated ribbon 90. The secondary structure septums 92 are interspersed with the secondary structure septums 94. Each secondary structure septum 92 (unless configured at a longitudinal end of the sidewall 44), for example, is disposed and may extend longitudinally between a respective longitudinally neighboring pair of the secondary structure septums 94. Similarly, each secondary structure septum 94 (unless configured at a longitudinal end of the sidewall 44) is disposed and may extend longitudinally between a respective longitudinally neighboring pair of the secondary structure septums 92.

The secondary corrugated structure 43 includes one or more secondary structure corrugations 96. Each of these secondary structure corrugations 96 includes a longitudinally neighboring pair of the secondary structure elements 86 and 88, 92 and 94.

Referring to FIG. 6, within the same secondary structure corrugation 96, each secondary structure septum 92 is connected to and may meet a respective secondary structure septum 94 at a peak 98 proximate the first skin 22. Each secondary structure septum 92, for example, extends to a first end 100 thereof. Each secondary structure septum 94 extends to a first end 102 thereof. Each septum first end 100 is (e.g., directly) connected to the first end 102 of the secondary structure septum 94 in the same secondary structure corrugation 96 at the first skin peak 98. The secondary structure septum 92 is angularly offset from the respective secondary structure septum 94 by an included angle 104; e.g., an acute angle, a right angle or an obtuse angle. This first skin peak angle 104 is greater than the first skin peak angle 76. The first skin peak angle 104 of FIG. 6, for example, may be between seventy degrees(70°) and one-hundred and seventy degrees (170°). The present disclosure, however, is not limited to such an exemplary first skin peak angle.

Each secondary structure septum 92 is connected to and may meet the secondary structure septum 94 in a longitudinally neighboring secondary structure corrugation 96 at a peak 106 towards the second skin 23. Each secondary structure septum 92, for example, extends to a second end 108 thereof. Each secondary structure septum 94 extends to a second end 110 thereof. Each septum second end 108 is (e.g., directly) connected to the second end 110 of the secondary structure septum 94 in the longitudinally neighboring secondary structure corrugation 96 at the second skin peak 106. The secondary structure septum 92 is angularly offset from the respective secondary structure septum 94 by an included angle 112; e.g., an acute angle, a right angle or an obtuse angle. This second skin peak angle 112 may be equal to the first skin peak angle 104 and greater than the second skin peak angle 84. The second skin peak angle 112 of FIG. 6, for example, may be between seventy degrees (70°) and one-hundred and seventy degrees (170°). The present disclosure, however, is not limited to such an exemplary second skin peak angle.

One or more or each of the primary structure corrugations 68 may be mated with (e.g., nested with/within) and/or connected to a respective one of the secondary structure corrugations 96. The first skin peak 70 of each primary structure corrugation 68 of FIG. 6, for example, is (e.g., longitudinally) aligned with the first skin peak 98 of a respective secondary structure corrugation 96. Each primary structure corrugation 68 projects vertically into a valley 114 (see also FIG. 7) formed by the secondary structure septums 92 and 94 of the respective secondary structure corrugation 96. Each primary structure corrugation 68 at its first skin peak 70 vertically engages (e.g., contacts) and may be connected (e.g., bonded and/or otherwise attached) to the respective secondary structure corrugation 96 at its first skin peak 98. Each second skin peak 78 of FIG. 6 may also be (e.g., longitudinally) aligned with a respective second skin peak 106. However, the primary corrugated structure 42 of FIG. 6 is vertically displaced from the secondary corrugated structure 43 at the respective aligned second skin peaks 78 and 106 by a vertical distance 116. This vertical distance 116 may be equal to or different (e.g., greater or less) than the core vertical thickness 40 (see FIG. 2). The vertical distance 116, for example, may be between thirty percent (30%) and eighty percent (80%) of the core vertical thickness 40. The present disclosure, however, is not limited to such an exemplary dimensional relationship.

The primary corrugated structure 42 of FIG. 6 vertically engages and is connected to the second skin 23. Each primary structure corrugation 68 of FIG. 6, for example, vertically contacts and is (e.g., directly) bonded and/or otherwise attached to the second skin 23 at the second skin peaks 78. Similarly, the secondary corrugated structure 43 of FIG. 6 vertically engages and is connected to the first skin 22. Each secondary structure corrugation 96 of FIG. 6, for example, vertically contacts and is (e.g., directly) bonded and/or otherwise attached to the first skin 22 at the first skin peaks 98. The primary corrugated structure 42 of FIG. 6 thereby vertically engages and is connected to the first skin 22 through the secondary corrugated structure 43. Similarly, the secondary corrugated structure 43 of FIG. 6 vertically engages and is connected to the second skin 23 through the primary corrugated structure 42.

With the foregoing configuration, each primary corrugated structure 42 is arranged vertically between and (e.g., directly) connected to the secondary corrugated structure 43 and the second skin 23. Each secondary corrugated structure 43 is arranged vertically between and (e.g., directly) connected to the first skin 22 and the primary corrugated structure 42. Each primary corrugated structure 42 may thereby longitudinally overlap a respective one of the secondary corrugated structures 43. Similarly, referring to FIG. 3, each primary corrugated structure 42 may laterally overlap a respective one of the secondary corrugated structures 43. Each associated pair of the corrugates structures 42 and 43 of FIG. 3, for example, extends laterally between and is connected to a respective laterally neighboring pair of the sidewalls 44.

Referring to FIG. 2, each of the internal chambers 46 extends vertically between and to the first skin 22 and the second skin 23. Each internal chamber 46 thereby extends vertically from the first skin 22, through the corrugated structures 42 and 43 (via the perforations 54 and 56), to the second skin 23. Each internal chamber 46 of FIG. 2 extends longitudinally between and to the primary structure baffles 64 of a longitudinally neighboring pair of the primary structure corrugations 68. Each internal chamber 46 thereby extends longitudinally from one of the primary structure baffles 64, through a respective primary structure septum 66 (via the perforations 54) and through respective secondary structure septums 92 and 94 (via the perforations 56), to another respective primary structure baffle 64. Each internal chamber 46 of FIG. 3 extends laterally between and to a respective laterally neighboring pair of the sidewalls 44.

Figure 8:
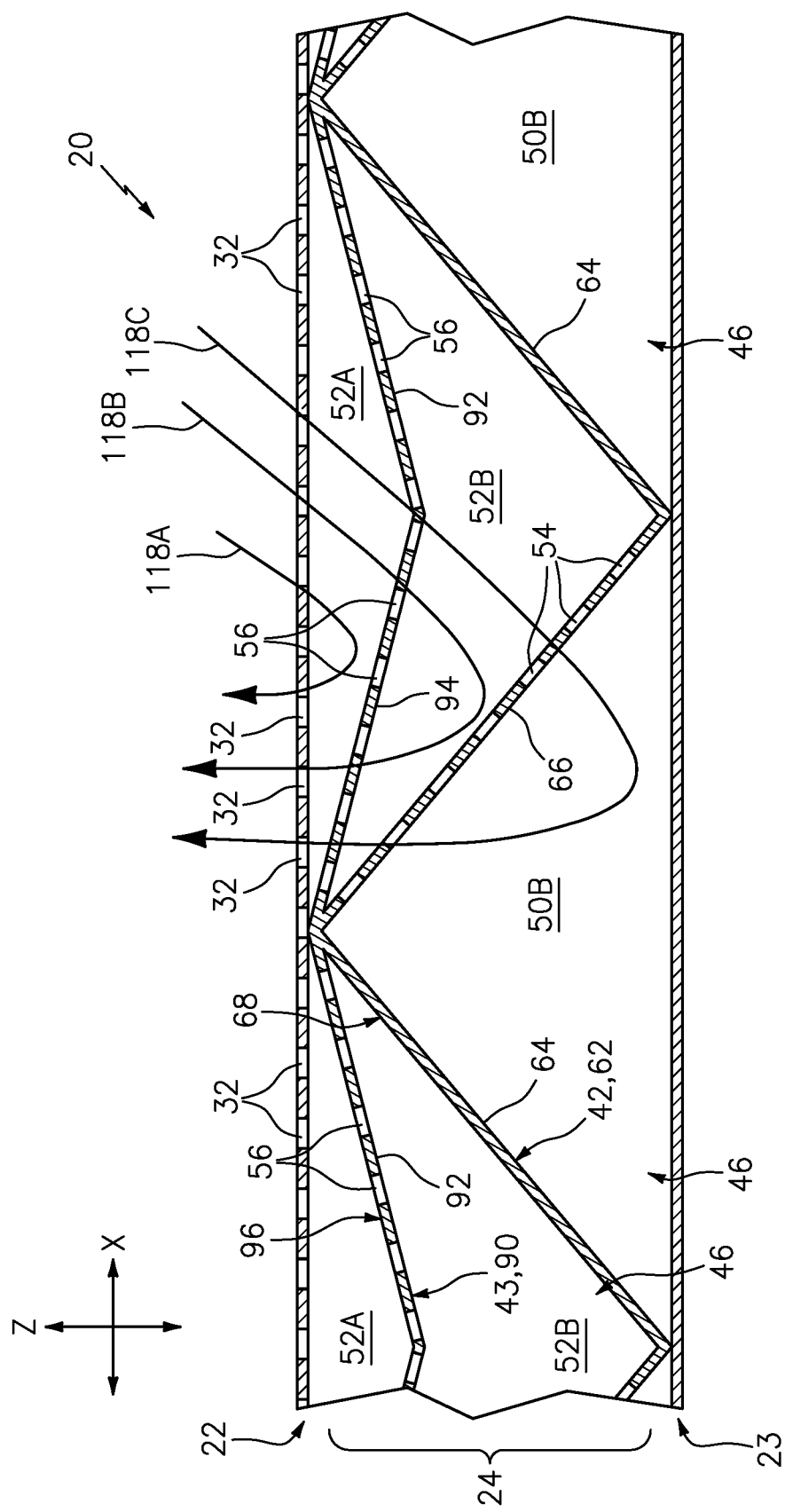
FIG. 8 is an enlarged illustration of a portion of the acoustic panel in FIG. 2 depicted with schematic sound wave trajectories.

The acoustic panel 20 is configured as a multi-degree of freedom (MDOF) acoustic panel. More particularly, the acoustic panel 20 of FIG. 8 is configured as a triple-degree of freedom (TDOF) acoustic panel. Sound waves entering each internal chamber 46, for example, may follow a plurality of trajectories 118A-C (generally referred to as "118"), which trajectories 118 are illustrated to schematically depict which cavities are involved rather than specific sound wave paths. The sound waves, of course, may also follow one or more additional trajectories not shown in FIG. 8. For example, one or more additional sound wave trajectories may exist due to interactions between the cavities 50B and 52B and/or between the cavities 52A and 52B that produce additional reflections.

The first trajectory 118A extends away from the respective perforations 32 in the first skin 22, is reversed by the secondary corrugated structure 43, and extends back to the respective perforations 32 in the first skin 22. The second trajectory 118B extends away from the respective perforations 32 in the first skin 22 and through respective perforations 56 in the secondary corrugated structure 43, is reversed by primary corrugated structure 42, and extends back through the respective perforations 56 in the secondary corrugated structure 43 to the respective perforations 32 in the first skin 22. The third trajectory 118C extends away from the respective perforations 32 in the first skin 22 and through the respective perforations 56 in the secondary corrugated structure 43 and the respective perforations 54 in the primary corrugated structure 42, is reversed by second skin 23, and extends back through the respective perforations 54 in the primary corrugated structure 42 and the respective perforations 56 in the secondary corrugated structure 43 to the respective perforations 32 in the first skin 22. With such an arrangement, each internal chamber 46 may be operable to reverse phase of a plurality of frequencies of the sound waves using known acoustic reflection principles and subsequently direct the reverse phase sound waves out of the acoustic panel 20 through the perforations 32 to destructively interfere with other incoming noise waves.

In some embodiments, referring to FIG. 2, each of the secondary structure panels 86 and 88 may be configured as a secondary structure septum 92 and 94. In other embodiments, referring to FIGS. 9 and 10, one or more of the secondary structure panels 86, 88 may each be configured as a secondary structure baffle 120; e.g., solid, non-perforated segments of a respective secondary structure corrugated ribbon 90. For example, referring to FIG. 9, each secondary structure second panel 88 may be configured as the secondary structure baffle 120. In such an embodiment, each secondary structure baffle 120 may (e.g., longitudinally and/or laterally) overlap a respective one of the primary structure baffles 64. Alternatively, referring to FIG. 10, each secondary structure first panel 86 may be configured as the secondary structure baffle 120. In such an embodiment, each secondary structure baffle 120 may (e.g., longitudinally and/or laterally) overlap a respective one of the primary structure septums 66. The placement of the secondary structure baffles 120 relative to the primary structure baffles 64 may be selected to tune the acoustics of the acoustic panel 20.

Figure 11:
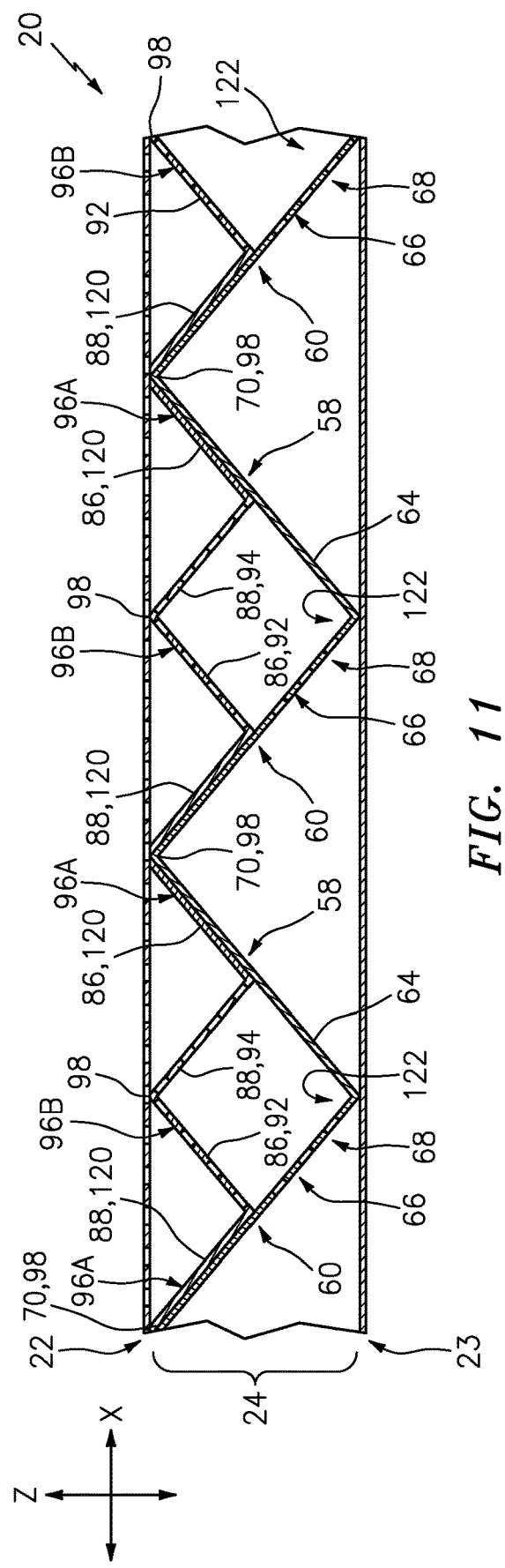

In some embodiments, referring to FIGS. 2, 9 and 10, the acoustic panel 20 may be configured with a one-to-one (1:1) correlation between the primary structure corrugations 68 and the secondary structure corrugations 96. Thus, each primary structure corrugation 68 may be longitudinally aligned with and/or (e.g., completely) longitudinally and/or laterally overlap a (e.g., single) respective one of the secondary structure corrugations 96. In other embodiments, referring to FIG. 11, the acoustic panel 20 may be configured with more secondary structure corrugations (e.g., 96A and 96B; generally referred to as "96") than primary structure corrugations 68. More particularly, each primary structure corrugations 68 may at least partially (or completely) longitudinally and/or laterally overlap a plurality of the secondary structure corrugations 96. Each primary structure corrugation 68 of FIG. 11, for example, partially longitudinally overlaps respective sides of two of the secondary structure corrugations 96A and completely longitudinally overlaps one of the secondary structure corrugations 96B that is between the other two secondary structure corrugations 96A.

In some embodiments, referring to FIG. 2, the first skin peak 98 of one or more of the secondary structure corrugations 96 may be (e.g., longitudinally and/or laterally) aligned with the first skin peaks 70 of a respective one of the primary structure corrugations 68. In other embodiments, referring to FIG. 11, the first skin peak 98 of one or more of the secondary structure corrugations 96 may be (e.g., longitudinally and/or laterally) aligned with a valley 122 formed by and between a longitudinally neighboring pair of the primary structure corrugations 68.

In some embodiments, referring to FIG. 2, the primary structure corrugations 68 may be connected to the secondary structure corrugations 96 at the first skin peaks 70 and 98. In other embodiments, referring to FIG. 11, each primary structure first panel 58 may be abutted against and connected to the secondary structure first panel 86 of a respective secondary structure corrugation (e.g., 96A). In addition or alternatively, the primary structure second panel 60 may be abutted against and connected to the secondary structure second panel 88 of a respective secondary structure corrugation (e.g., 96A).

Figure 12:
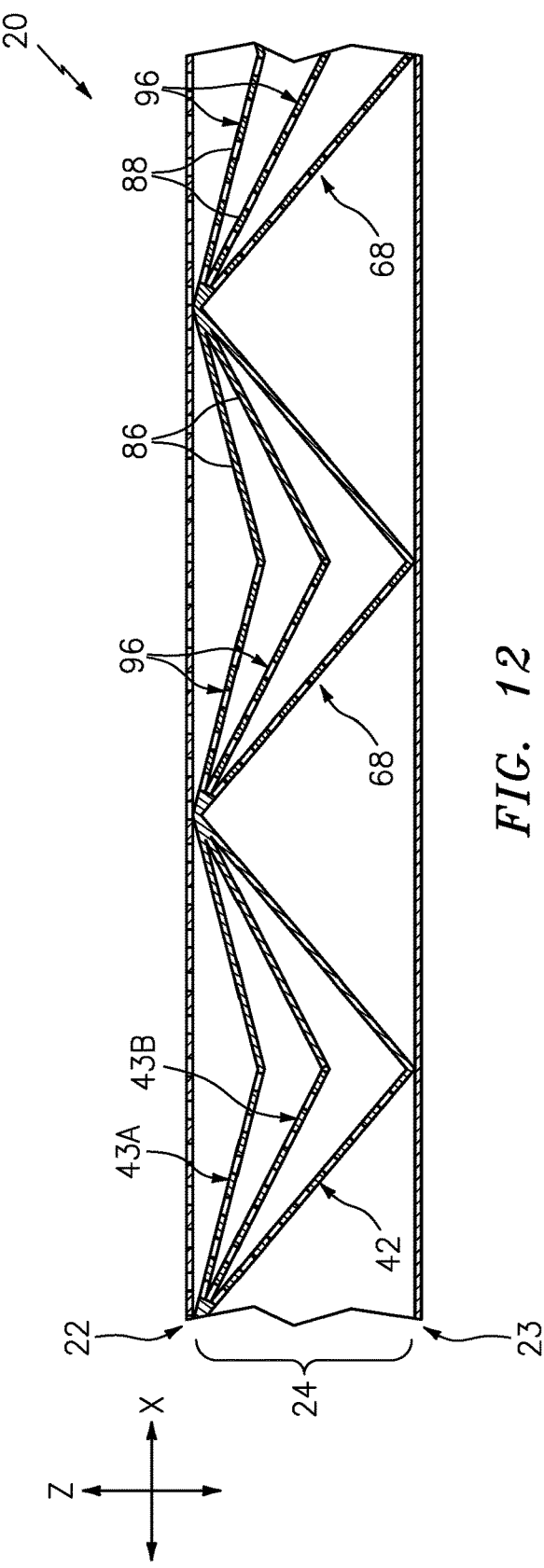

In some embodiments, referring to FIG. 2, the acoustic panel 20 may include a single secondary corrugated structure 43 vertically between a respective one of the primary corrugated structures 42 and the first skin 22. In other embodiments, referring to FIG. 12, the acoustic panel 20 may include a plurality of the secondary corrugated structures 43A and 43B (generally referred to as "43") vertically between a respective one of the primary corrugated structures 42 and the first skin 22. In other embodiments, referring to FIGS. 13 and 14, the acoustic panel 20 may also or alternatively include at least one (or more) of the secondary corrugated structures (e.g., 43 in FIG. 13, 43B in FIG. 14) vertically between the primary corrugated structure 42 and the second skin 23.

Each corrugation 96 in each of the secondary corrugated structures 43 of FIGS. 11-14 includes a secondary structure first panel 86 and a secondary structure second panel 88. The first panel 86 in any one or more or all of the secondary structure corrugations 96 may be configured as a respective secondary structure septum. In addition or alternatively, the second panel 88 in any one or more of the secondary structure corrugations 96 may be configured as a respective secondary structure baffle. Thus, each of the acoustic panels 20 of FIGS. 11-14 may be tuned for various sound attenuation.

In some embodiments, one or more or each of the corrugated structures 42, 43 may have symmetric corrugations. For example, referring to FIG. 6, the first skin peak angle 76 is equal to the second skin peak angle 84, and a length of the primary structure elements 58 and 64 is equal to a length of the primary structure elements 60 and 66 (e.g., when viewed in the x-z plane). Each of the primary structure elements 58, 60, 64 and 68 is also angularly offset from the first skin 22 (and/or the second skin 24) by a common included angle; e.g., an acute angle. Similarly, the first skin peak angle 104 is equal to the second skin peak angle 112, and a length of the secondary structure elements 86 and 92 is equal to a length of the secondary structure elements 88 and 94 (e.g., when viewed in the x-z plane). Each of the second structure elements 86, 88, 92 and 94 is also angularly offset from the first skin 22 (and/or the second skin 24) by a common included angle; e.g., an acute angle.

In some embodiments, one or more of or each of the corrugated structures 42, 43 may have asymmetric corrugations. For example, referring to FIGS. 15 and 16, the length of the primary structure elements 58 and 64 is different (e.g., greater, or less) than the length of the primary structure elements 60 and 66 (e.g., when viewed in the x-z plane). Each of the primary structure elements 58 and 64 is also angularly offset from the first skin 22 (and/or the second skin 24) by a first included angle 124 (e.g., an acute angle), whereas each of the primary structure elements 60 and 66 is angularly offset from the first skin 22 (and/or the second skin 24) by a second included angle 126 (e.g., a right, ninety degree angle) that is different (e.g., greater, or less) than the first included angle 124. In addition or alternatively, the length of the secondary structure elements 86 and 120 is different (e.g., greater, or less) than the length of the secondary structure elements 88 and 94 (e.g., when viewed in the x-z plane). Each of the secondary structure elements 86 and 120 is also angularly offset from the first skin 22 (and/or the second skin 24) by a first included angle 128 (e.g., an acute angle), whereas each of the secondary structure elements 88 and 94 is angularly offset from the first skin 22 (and/or the second skin 24) by a second included angle 130 (e.g., a right, ninety degree angle) that is different (e.g., greater, or less) than the first included angle 128.

Figure 17A:
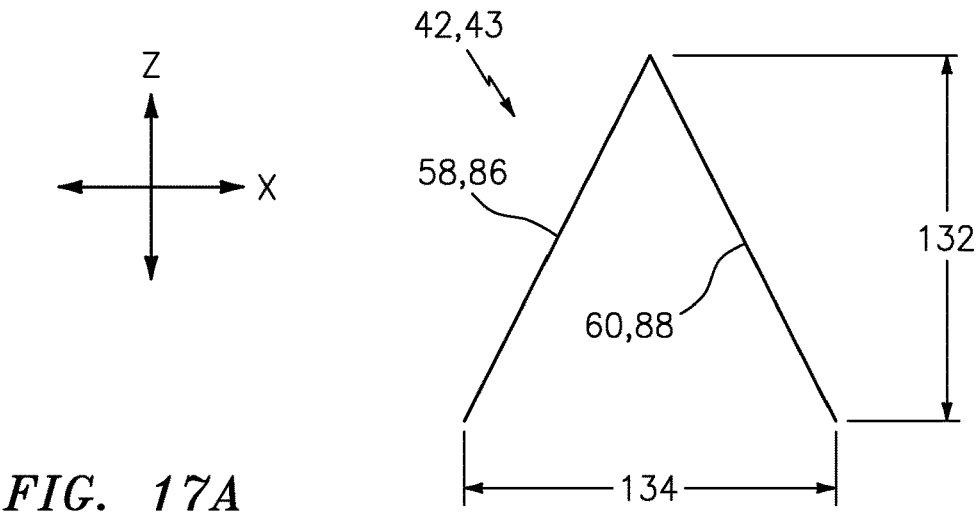
FIGS. 17A-17C are partial sectional illustrations of the acoustic panel with various aspect ratios.
Figure 17B:
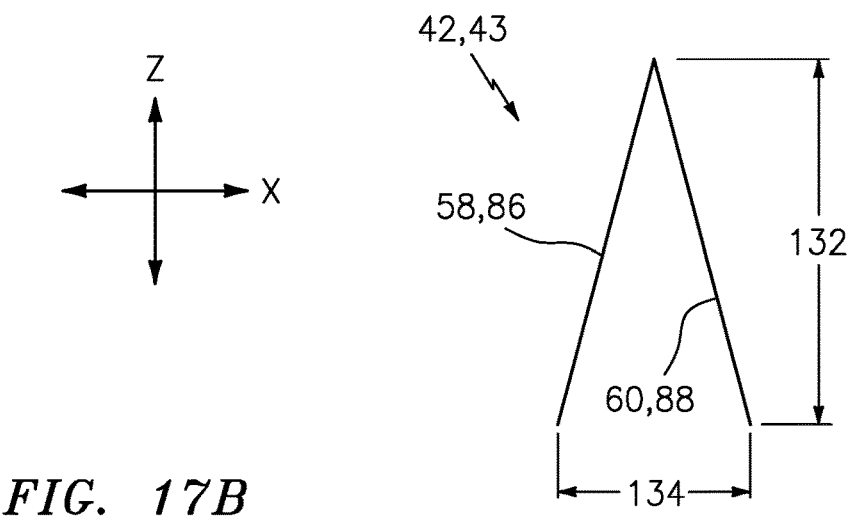
Figure 17C:
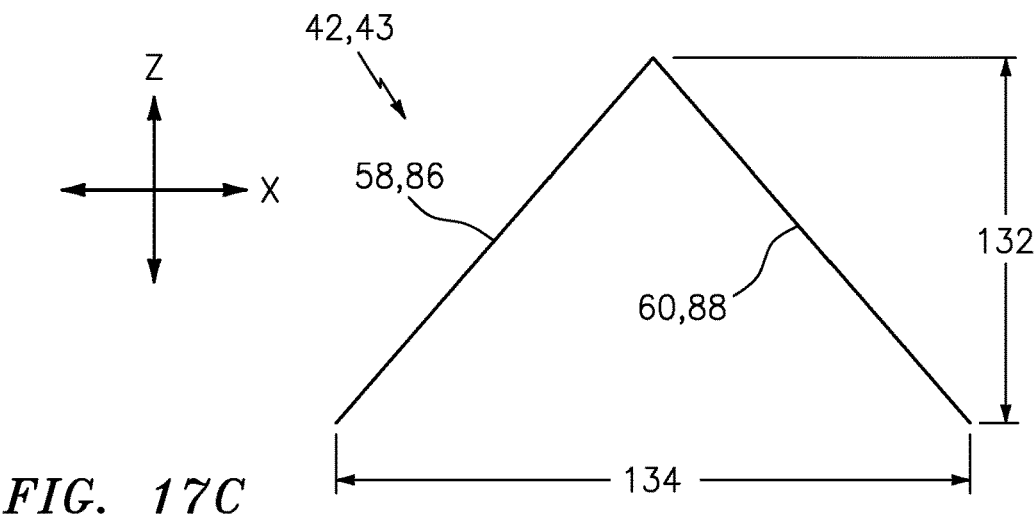

Referring to FIGS. 17A-C, each of the corrugated structures 42, 43 has an aspect ratio. This aspect ratio may be determined by dividing a vertical height 132 of the respective corrugated structure by a longitudinal length 134 of a corrugation in the respective corrugated structure 42, 43. The aspect ratio may be 1:1 (see FIG. 17A), greater than 1:1 (e.g., see FIG. 17B) or less than 1:1 (e.g., see FIG. 17C).

The cellular core 24 may be constructed from various material(s). The cellular core 24, for example, may be constructed from metal, polymer (e.g., thermoplastic or thermoset material), a fiber reinforced composite (e.g., fiber reinforcement such as, but not limited to, fiberglass, carbon fiber and/or aramid fibers within a polymer matrix), or a combination thereof. One or more or all components of the cellular core 24 may be constructed from the same (e.g., identical) or a like material. The cellular core material may also be the same or similar to the first skin material and/or the second skin material. Alternatively, one or more of the components of the cellular core 24 may be constructed from a different material than one or more of the other components of the cellular core 24.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
a perforated first skin;
a second skin; and
a core between and connected to the perforated first skin and the second skin, the core including a plurality of chambers, a first corrugated structure and a second corrugated structure;
the plurality of chambers including a first chamber, the first chamber extending from the perforated first skin, through the first corrugated structure and the second corrugated structure, to the second skin;
the first corrugated structure comprising a first corrugation with a first peak, the first corrugation extending in a direction towards the perforated first skin to the first peak, and the first corrugation directly contacting the perforated first skin; and
the second corrugated structure comprising a second corrugation with a second peak, the second corrugation extending in the direction towards the perforated first skin to the second peak, the second corrugation directly contacting the second skin, and the second peak longitudinally aligned with the first peak.

2. The acoustic panel of claim 1, wherein
the second corrugated structure further comprises a third corrugation and a fourth corrugation; and
the first corrugated structure further comprises a fifth corrugation with a fifth peak, and the fifth peak is aligned with a valley formed by and between the third corrugation and the fourth corrugation.

3. The acoustic panel of claim 1, wherein
the first corrugation comprises one or more first perforations;
the second corrugation comprises one or more second perforations; and
the first chamber extends from the perforated first skin, through the one or more first perforations and the one or more second perforations, to the second skin.

4. The acoustic panel of claim 1, wherein
the first corrugation comprises a first structure first panel and a first structure second panel that is connected to the first structure first panel at the first peak, and the first structure first panel is angularly offset from the first structure second panel by a first angle; and the second corrugation comprises a second structure first panel and a second structure second panel that is connected to the second structure first panel at the second peak, and the second structure first panel is angularly offset from the second structure second panel by a second angle that is different than the first angle.

5. The acoustic panel of claim 4, wherein
the first structure first panel is configured as a baffle; and
the first structure second panel and the second structure second panel are each configured as a septum.

6. The acoustic panel of claim 5, wherein the second structure first panel is configured as a septum.

7. The acoustic panel of claim 5, wherein the second structure first panel is configured as a baffle.

8. The acoustic panel of claim 7, wherein the second structure first panel overlaps the first structure first panel.

9. The acoustic panel of claim 7, wherein the second structure first panel overlaps the first structure second panel.

10. The acoustic panel of claim 1, wherein
the first corrugation is one of a plurality of first corrugations; and
the second corrugation overlaps the plurality of first corrugations.

11. The acoustic panel of claim 1, wherein
the core further includes a third corrugated structure; and
the first chamber extends from the perforated first skin, through the first corrugated structure, the third corrugated structure and the second corrugated structure, to the second skin.

12. The acoustic panel of claim 1, wherein
the core further includes a first sidewall and a second sidewall;
the first chamber extends laterally between the first sidewall and the second sidewall;
the first corrugated structure and the second corrugated structure are each connected to and extends laterally between the first sidewall and the second sidewall.

13. The acoustic panel of claim 1, wherein at least the perforated first skin, the second skin and the core form a component of an aircraft propulsion system.

14. The acoustic panel of claim 1, wherein the second corrugation contacts the first corrugation.

15. The acoustic panel of claim 1, wherein the core further includes a third corrugated structure between the first corrugated structure and the second corrugated structure.

16. The acoustic panel of claim 1, wherein
the first corrugation is connected to the perforated first skin; and
the second corrugation is connected to the second skin and the first corrugation.

17. An acoustic panel, comprising:
a perforated first skin;
a second skin; and
a core between and connected to the perforated first skin and the second skin, the core including a plurality of chambers, a first corrugated structure and a second corrugated structure;
the plurality of chambers including a first chamber, the first chamber extending from the perforated first skin, through the first corrugated structure and the second corrugated structure, to the second skin;
the first corrugated structure comprising a first corrugation, and the first corrugation directly contacting the perforated first skin; and the second corrugated structure comprising a second corrugation that is nested with the first corrugation, and the second corrugation directly contacting the second skin.

18. The acoustic panel of claim 17, wherein the second corrugation contacts the first corrugation.

19. The acoustic panel of claim 17, wherein the core further includes a third corrugated structure between the first corrugated structure and the second corrugated structure.

\* \* \* \* \*